United States Patent
Niessen et al.

(10) Patent No.: US 10,137,822 B2
(45) Date of Patent: Nov. 27, 2018

(54) HEADLAMP FASTENING SYSTEM FOR MOTOR VEHICLES AND METHOD

(71) Applicant: Ford Global Technologies, LLC, Dearborn, MI (US)

(72) Inventors: Bert Niessen, Nordrhein-Westfalen (DE); Boris Herrmann, Nordrhein-Westfalen (DE); Mark Witschel, Nordrhein-Westfalen (DE); Thorsten Warwel, North Rhine Westphalia (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/662,497

(22) Filed: Jul. 28, 2017

(65) Prior Publication Data

US 2018/0029524 A1 Feb. 1, 2018

(30) Foreign Application Priority Data

Jul. 29, 2016 (DE) .................. 10 2016 214 082

(51) Int. Cl.
*B60Q 1/04* (2006.01)
*F21S 41/19* (2018.01)
(Continued)

(52) U.S. Cl.
CPC ........... *B60Q 1/0441* (2013.01); *B60Q 1/045* (2013.01); *B62D 25/084* (2013.01);
(Continued)

(58) Field of Classification Search
USPC ................................ 362/459–549
See application file for complete search history.

(56) References Cited

U.S. PATENT DOCUMENTS

2009/0315345 A1* 12/2009 Eckert .................. B60Q 1/0416
293/117
2016/0068192 A1* 3/2016 Sakai ..................... B62D 25/08
296/187.09

FOREIGN PATENT DOCUMENTS

DE 102005030676 A1 1/2007
DE 102013207388 A1 10/2014
(Continued)

OTHER PUBLICATIONS

Nexus PC Mounting Kit web page Sep. 14, 2017.

*Primary Examiner* — Matthew Mikels
(74) *Attorney, Agent, or Firm* — Jason Rogers; Price Heneveld LLP

(57) ABSTRACT

A headlamp fastening system for a vehicle is provided herein. The headlamp fastening system includes a support structure, a headlamp structure, and an alignment element. The alignment element is configured to align and fix the headlamp structure with the support structure with respect to the z-direction of the vehicle. The alignment element holds the sup port structure and the headlamp in an alignment position. In the alignment position the support structure and the headlamp structure are relatively displaceable in the x-, y-, and z-direction relative to one another. The alignment element fixes the support structure and the headlamp in the fixed position, wherein, upon the alignment element fixing the support structure and the headlamp structure relative to one another with respect to the z-direction, the support structure and the headlamp structure simultaneously become fixed relative to one another in the x- and y-direction.

14 Claims, 4 Drawing Sheets

(51) Int. Cl.
  *B62D 25/08*  (2006.01)
  *F16B 21/08*  (2006.01)
(52) U.S. Cl.
  CPC .......... *F16B 21/086* (2013.01); *F21S 41/198* (2018.01); *F21S 41/192* (2018.01)

(56) References Cited

FOREIGN PATENT DOCUMENTS

| | | |
|---|---|---|
| DE | 102013220574 A1 | 4/2015 |
| DE | 112006003568 B4 | 5/2017 |
| EP | 0735284 A2 | 10/1996 |
| FR | 2901516 A1 | 11/2007 |
| FR | 2949724 A1 | 3/2011 |
| WO | 2009106261 A1 | 9/2009 |

* cited by examiner

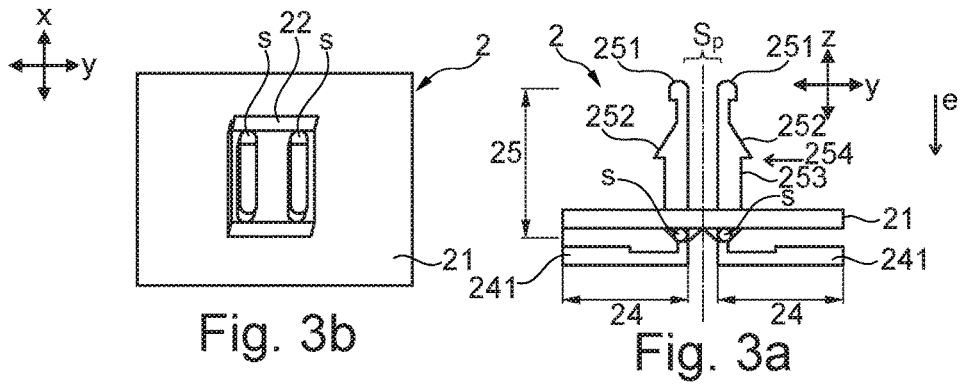
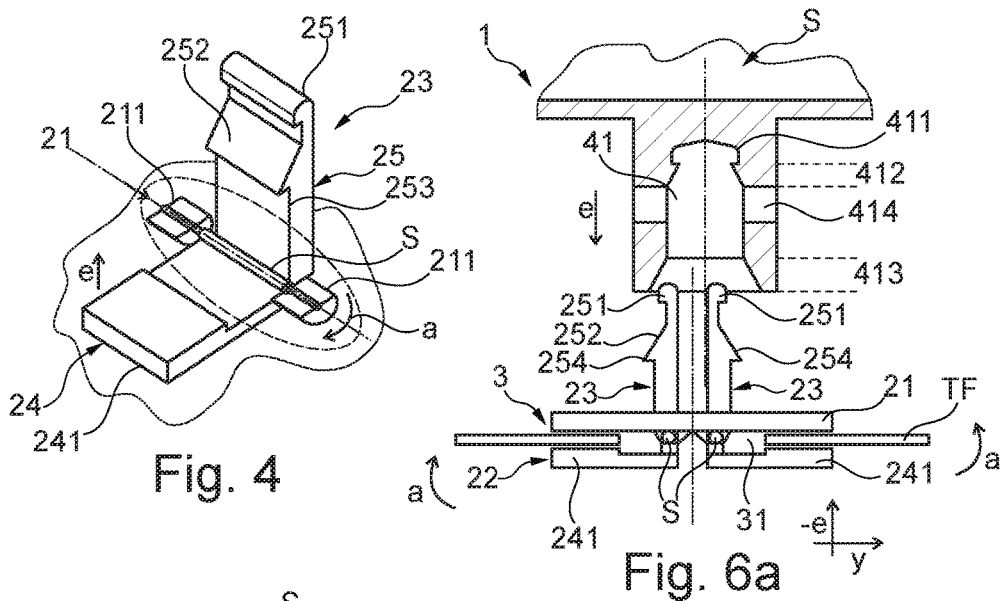
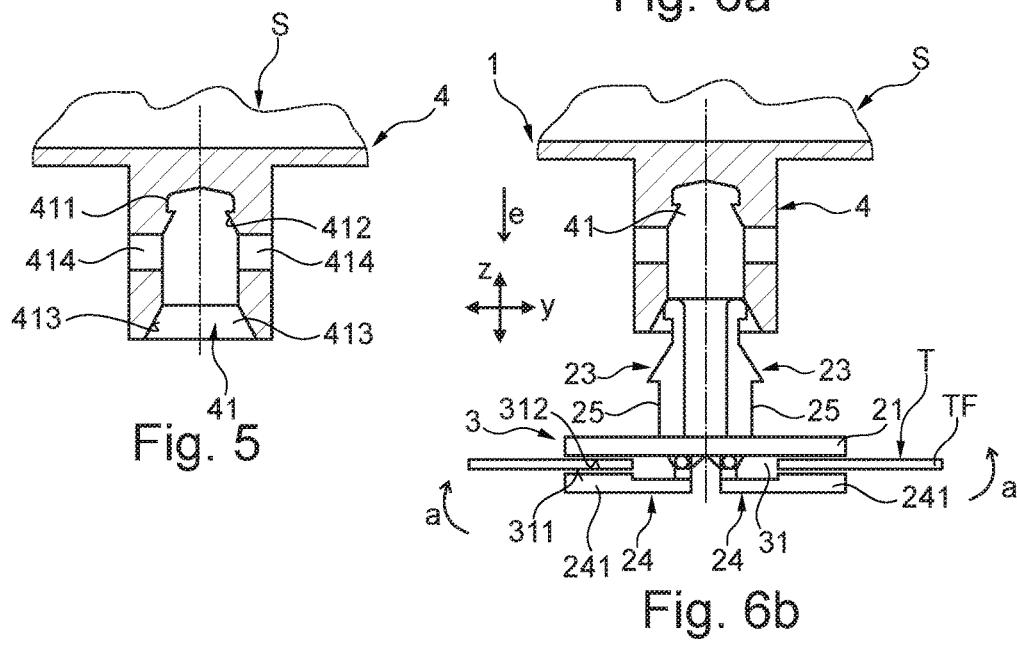

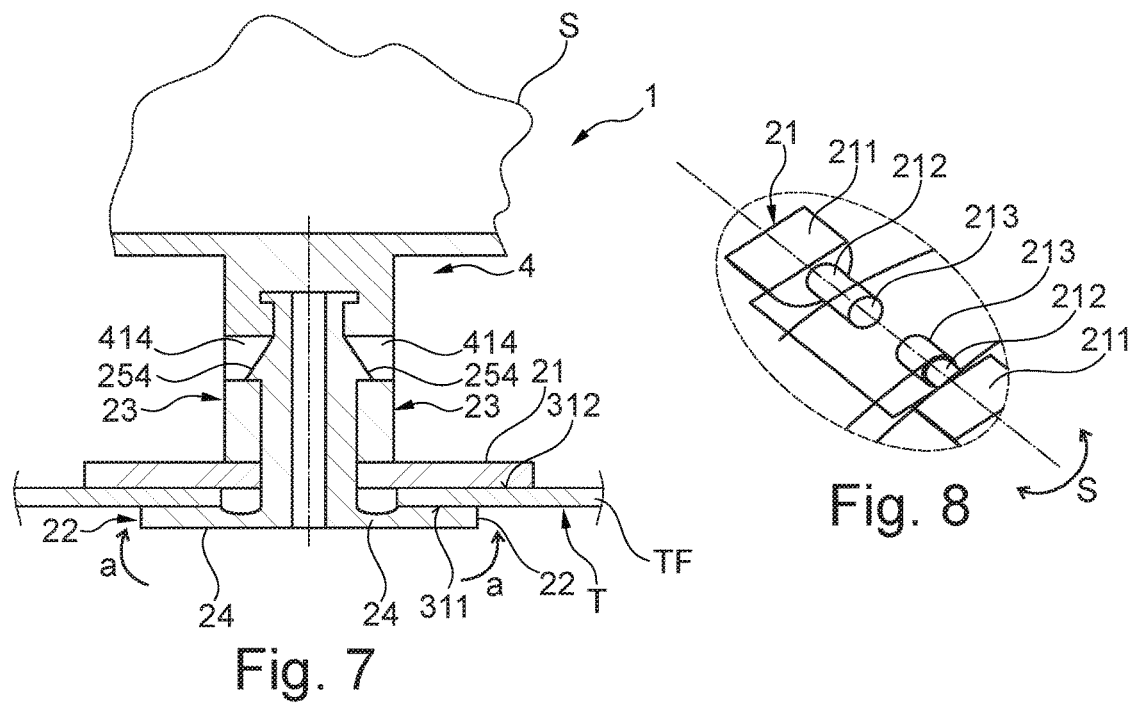
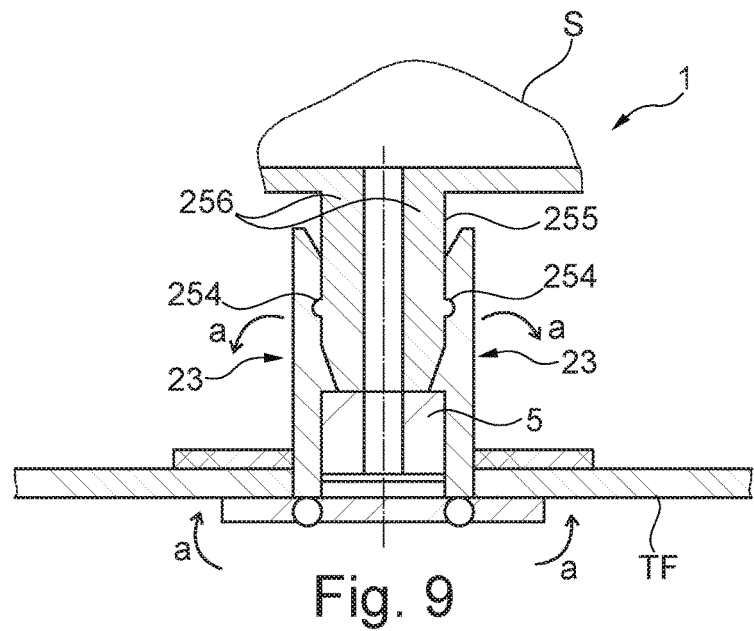

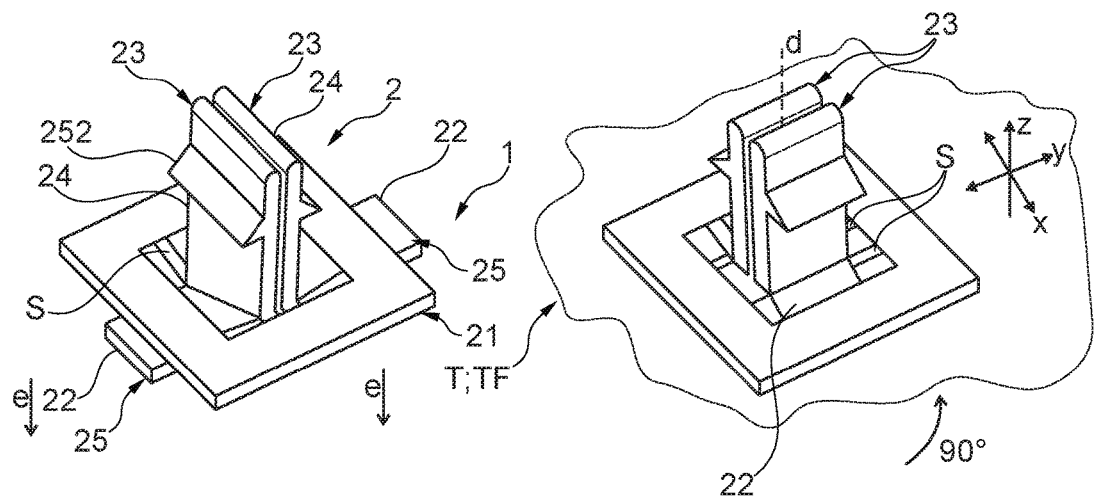
Fig. 10 I    Fig. 10 II
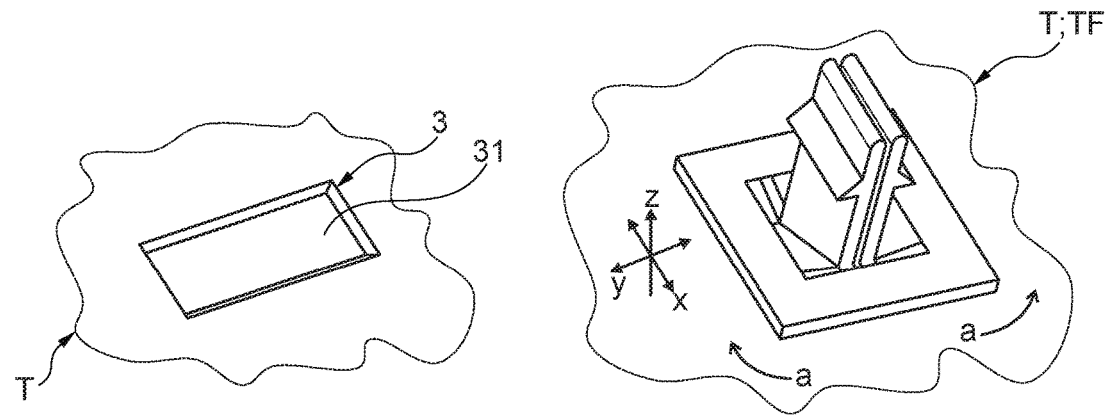
Fig. 10 IV    Fig. 10 III

HEADLAMP FASTENING SYSTEM FOR MOTOR VEHICLES AND METHOD

FIELD OF THE INVENTION

The present disclosure generally relates to a headlamp fastening system for a motor vehicle for fastening and aligning a headlamp structure to a support structure of the motor vehicle, in particular to a vehicle wing fastening structure and a radiator mounting structure, in respect of the three spatial directions, in particular the x-, y- and z-direction of the vehicle, and also a method of achieving this using the headlamp fastening system. More specifically, a headlamp fastening system with a 1-valued alignment element for fastening and aligning the headlamp structure in the z-direction on one of the support structures.

BACKGROUND OF THE INVENTION

It is customary in the case of a headlamp fastening system of this kind for the headlamp structure to be fastened and aligned observing the so-called 3-2-1 principle, according to which the headlamp structure is aligned and fastened to the two support structures of the motor vehicle at three points. For example, in a case in which the vehicle wing fastening structure is one of the support structures and the radiator mounting structure is the other support structure, the headlamp structure may be fastened to the vehicle wing fastening structure via a so-called 3-valued alignment element in respect of the x-, y- and z-directions. The headlamp may then be fastened to the radiator mounting structure via a so-called 2-valued alignment element in respect of the y- and z-directions. It is customary to use screws in the latter case, which means that the headlamp will likely also be fixed in the x-direction.

Consequently, the third fastening performed by means of the 1-valued alignment element is only intended to align the headlamp structure in the z-direction and not to force it into a position in the x- and y-direction, as the system has already been completely statically determined according to the 3-2-1 principle. This redundancy in the third fastening has a variety of disadvantageous including producing a poorer slit and fit image of the structures. In addition, there is a high risk of stress fractures in the headlamp structure, because the third fastening may require the headlight to bend, which applies an unwanted load to the headlamp. Consequently, the third fastening will usually have some tolerance for freedom of movement. Normally this tolerance or play is zero to +/−3 mm in respect of the x-direction and the y-direction. This tolerance has two important disadvantages. First, there is a risk of the headlamp structure developing significant headlamp vibrations when the motor vehicle is running. Second, the headlamp structure often cannot support the vehicle wing attachment structurally, because the +/−3 mm of tolerance is exhausted when a load is applied to the vehicle wing fastening structure or the bumper skin coupled thereto.

SUMMARY OF THE INVENTION

According to one aspect of the present disclosure, a headlamp fastening system for a vehicle is disclosed. The headlamp fastening system includes a support structure, a headlamp structure, and an alignment element. The alignment element is configured to align and fix the headlamp structure with the support structure with respect to the z-direction of the vehicle. The alignment element holds the support structure and the headlamp in an alignment position. In the alignment position the support structure and the headlamp structure are relatively displaceable in the x-, y-, and z-direction relative to one another. The alignment element fixes the support structure and the headlamp in the fixed position, wherein, upon the alignment element fixing the support structure and the headlamp structure relative to one another with respect to the z-direction, the support structure and the headlamp structure simultaneously become fixed relative to one another in the x- and y-direction.

According to another aspect of the present disclosure, a method for fastening and aligning a headlamp structure on a vehicle is disclosed. The method includes forming a vehicle wing fastening structure, a radiator mounting structure, and a headlamp structure. Next, a 1-valued alignment element is aligned and fixed to the headlamp structure with at least one of the vehicle wing fastening structure and the radiator mounting structure with respect to the z-direction relative to the x-, y-, and z-direction of the vehicle. Next, the 1-valued alignment element is used to hold the vehicle wing fastening structure, the radiator mounting structure and said headlamp structure in an alignment position, wherein the vehicle wing fastening structure, the radiator mounting structure and the headlamp structure are relatively displaceable in the x-, y-, and -z direction relative to one another. Lastly, said headlamp structure is placed in a fixing position, wherein, upon the 1-valued alignment element fixing the vehicle wing fastening structure, the radiator mounting structure, and the headlamp structure relative to one another with respect to the z-direction, the vehicle wing fastening structure, the radiator mounting structure and the headlamp structure simultaneously become fixed relative to one another in the x- and y-direction.

According to yet another aspect of the present disclosure, a headlamp fastening system for a vehicle is disclosed. The headlamp fastening system includes a support structure and a headlamp structure. An alignment element is configured to align and fix the headlamp structure with the support structure with respect to the z-direction of the vehicle. The alignment element holds the support structure and the headlamp structure in an alignment position and a fixing position. The support structure and the headlamp structure simultaneously become fixed relative to one another in the x- and y-direction.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3a is a side view of an alignment element of a headlamp fastening system, according to at least some examples;

FIG. 3b is a top view of the alignment element of a headlamp fastening system, according to at least some examples;

FIG. 4 is a perspective view of a rotatably mounted tilting lever of the orientation element according to FIG. 3, according to at least some examples;

FIG. 5 is a longitudinal sectional view of a fixing receiver assembly provided on the headlamp structure, according to at least some examples;

FIG. 6a is a longitudinal sectional view of the headlamp fastening system with a longitudinal sectional view of the fastening receiver according to FIG. 5 and a side view of the alignment element according to FIG. 3a which is arranged in an xx-plane perpendicularly to the image plane displaceably on a cavity of an alignment receiver assembly provided on the vehicle wing fastening structure in this case, according to at least some examples;

FIG. 6b is a longitudinal sectional view of the headlamp fastening system illustrated in FIG. 6a, according to at least some examples;

FIG. 7 is a longitudinal sectional view of the fastening system in the fixing position of the alignment element depicted in a different example in this case in the fastening receiver, according to at least some examples;

FIG. 8 is an enlarged perspective view of area VIII according to FIG. 4, according to at least some examples;

FIG. 9 is a longitudinal sectional view of the fastening system in the fixing position of the alignment element, according to at least some examples;

FIG. 10I is a perspective view of the fastening element within the alignment receiver assembly, according to at least some examples;

FIG. 10II is a perspective view of the fastening element within the alignment receiver assembly, according to at least some examples;

FIG. 10III is a perspective view of the fastening element within the alignment receiver assembly, according to at least some examples; and FIG. 10IV is a perspective view of an alignment receiver assembly provided on a support structure, according to at least some examples.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the embodiment as oriented in the respective figure (FIG.) itself, unless it is specifically otherwise defined. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
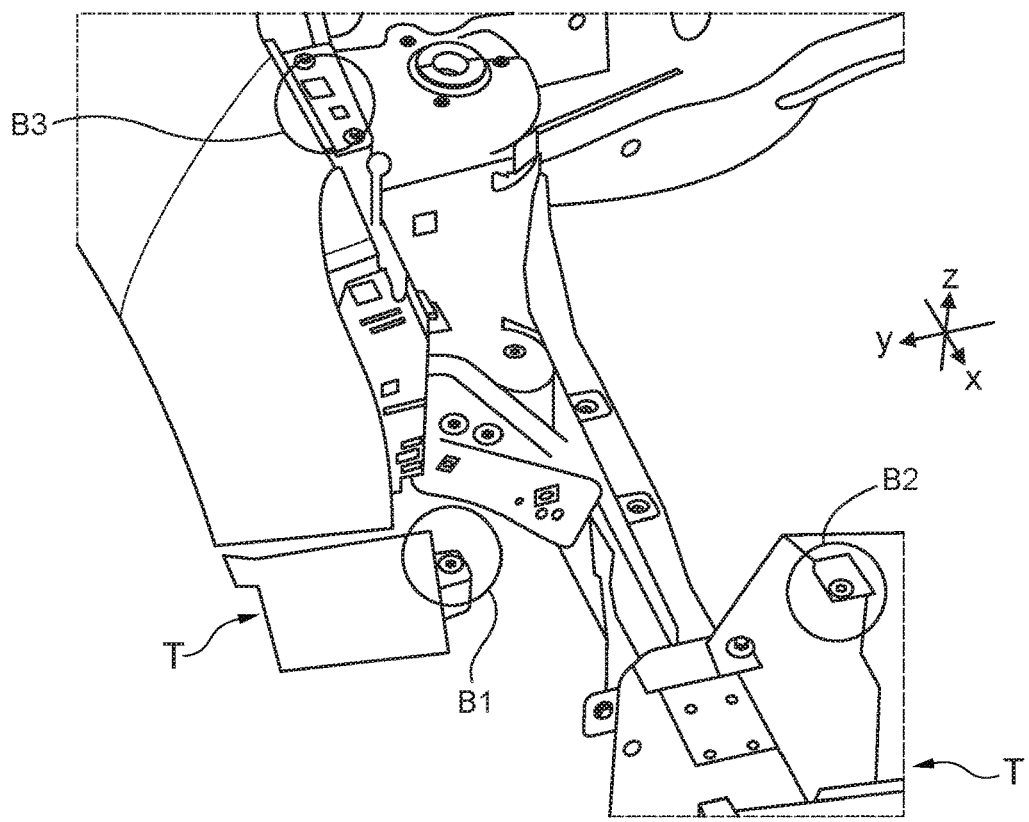
FIG. 1 is a perspective plan view of a customary vehicle wing fastening structure and customary radiator mounting structure with fastening points B1-B3 according to the 1-2-3 principle drawn in, according to at least some examples.
Figure 2:
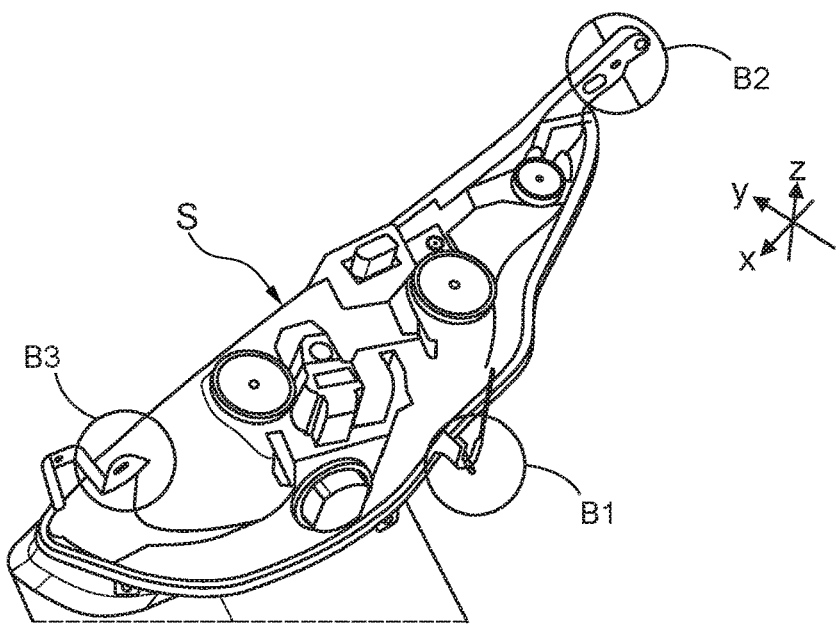
FIG. 2 is a perspective plan view of a customary headlamp structure with the fastening points B1-B3 drawn in, as in FIG. 1, according to at least some examples.

FIG. 1 shows a perspective view of two customary support structures T, i.e. a customary vehicle wing fastening TF, and FIG. 2 shows a perspective view of a headlamp structure S with the fastening points B1 to B3 drawn in in each case, at which the headlamp structure S is fixed according to the 3-2-1 principle to the support structures T. In different views and partial views in FIGS. 3-10, examples are shown of a headlamp fastening system 1 for motor vehicles not represented here for fastening and aligning the headlamp structure S in respect of the x-, y- and z-directions of the vehicle in this case to the two support structures T, namely for the fastening point B3. For the fastening point B3, a 1-value alignment element 2 of the headlamp fastening system 1 is provided according to the 3-2-1 principle for the fastening and alignment of the headlamp structure S in the z-direction to the support structures T.

The headlamp fastening system 1 according to at least some examples is configured in such a manner that the fixing of the first alignment element 2 to the structures to be connected, in this case the vehicle wing fastening structure TF and the headlamp structure S, in respect of the z-direction simultaneously initiates the fixing thereof in respect of the xy-plane. The structures to be connected are held relatively displaceably to one another via the 1-valued alignment element 2 in a first position depicted in FIGS. 6a and 6b of the x-, y- and z-direction of the vehicle. Via the alignment element 2 for alignment in the z-direction in the alignment position, the structures to be connected are arranged in a consistently loose manner to one another in respect of the xy-plane and in respect of the z-direction. In this case, the play in respect of the z-direction is less than +/−3 mm, while the play in respect of the xy-plane in this case is more than +/−3 mm.

To be more precise, as explained below, the relative displaceability of the alignment element 2 in a first alignment phase exists in all three directions x, y, and z in FIG. 6a, while this, as a consequence of the progressive connection of the structures S, KT to one another via the alignment element 2 according to FIG. 6b, passes into a second orientation phase in which the relative movability in the xy-plane is increasingly limited. Likewise, the alignment position of the headlamp fastening system 1 is shown in FIG. 10II, despite the fact that the headlamp fastening system is not shown complete, i.e. without the headlamp structure with a fixing receiver assembly provided there. In FIGS. 6 and 8, the headlamp fastening system 1 is shown in a fixing position in each case, in which the alignment element 2 is moved from the alignment position into a fixing position, wherein this transfer into the fixing position for fixing the structures in the z-direction takes place simultaneously with the fixing thereof in the x-direction and the y-direction.

In some examples, an alignment receiver assembly 3 is provided on the vehicle wing fastening structure TF and a fixing receiver assembly 4 configured as a catch fastening receiver on the headlamp structure S. The alignment receiver assembly 3 has a cavity 31 introduced into the vehicle wing fastening structure TF with an elongate opening profile (FIG. 10I), into which the alignment element 2, introduced into the alignment receiver assembly 3 in an engagement direction parallel to the z-direction, is held relatively displaceably in relation to the xy-plane and with play in respect of the z-direction for easier displaceability.

The alignment element, 2 in this case, includes a lever device having two tilting levers 23, each of which engages in an effective force-transmitting manner with the alignment receiver assembly 3 provided on the support structure T on the one hand and, in this case, in the z-direction spaced apart therefrom with the fixing receiver assembly 4 provided on the headlamp structure S on the other hand. The tilting levers 23 each have two lever arms disposed at right angles to one another, i.e. a first lever arm 24 and a second lever arm 25. The first lever arm 24 engages in the engagement direction e through the cavity 31 with the alignment receiver assembly 3 and lies displaceably in the alignment position (in this case in the xy-plane). In the fixing position, the first lever arm, with elastic prestressing, pushes frictionally against the engagement direction e on the underside on the rear side face 311 of the alignment receiver assembly 3.

The two tilting levers 23 are arranged radially opposite one another with respect to the z-direction z and are spaced apart from one another via a slot 26. In the fixing position, their second lever arms 25 are arranged parallel to one another and extending in the z-direction and their first lever arms are arranged facing radially away from one another in respect of the engagement direction e.

The orientation element 2 makes contact in a clamp-like manner with the side faces delimiting the opening edge of the cavity 31 at the top and bottom, the rear side face 311 in the engagement direction and the front side face 312 in the engagement direction e. For this purpose, the alignment element 2 has a front clamp part 21 which bears against the front side face 311 in the engagement direction e in a stop-effective manner. The front clamp part 21 is plate-like and configured to extend in relation to the engagement direction e radially outwards from the alignment element. In addition, a rear clamp part 22 is provided which is formed by the first lever arm 24.

The tilting levers 23 are each pivotably mounted in a hinge connection on the alignment element 2 on the front clamp part 21 about a pivot axis s and are arranged in a system rotating direction a against the rear side face 311 pivotably into the fixing position. In this case, a section 241 of the first lever arm 24 projecting beyond the cavity 31 in the engagement direction e is brought into abutment with tolerance against the rear side face 311 in the alignment position and in the fixing position in this case (FIG. 6) into frictional abutment. As can easily be seen from the figures, the tilting levers 23 strike against one another in order to limit the pivoting movement against the system rotating direction a.

As illustrated FIGS. 10I-10IV, the first lever arm 24 has an elongate cross section in respect of the z-direction z, to which the opening cross section of the cavity 31 is adapted with an oversize. In a first step (FIG. 10I), the first lever arm 24 is inserted with its portion 241 through the cavity 31 in the alignment receiver assembly 3 into an insertion position, wherein the first lever arm is arranged with its cross section roughly flush with the opening cross section of the cavity 31 and the front clamping part 21 strikes at the front against the front side face 312 in the engagement direction e. The plate-shaped front clamp part 21 is of such dimensions with regard to its extent in the xy-plane that it cannot be guided through the same in any rotational position of the alignment element 2 relative to the cavity 31 through said cavity and is therefore constantly stop-effective in the insertion direction e.

In a second step (FIG. 10II), alignment element 2 is brought into the alignment position from the insertion position with a rotational movement according to the directional arrow shown about 90°. Since the opening cross section of the cavity 31 exhibits an oversize in respect of the first lever arm 24, the first lever arm 24 and therefore the alignment element 2 may be displaceable with respect to the xy-plane relative to the cavity 31 in the same. This relative movement in the xy-plane is limited by the radial boundary of the cavity 31.

In a third step (FIG. 10III), in order for it to function as a rear clamp part 22, the first lever arm 24 is pressed via the actuation of the tilting lever 23 on the second lever arm 25 thereof in the fixing rotational direction to the front clamp part 21 and therefore with frictional abutment against the rear side face 311 in the engagement direction e. In this way, the alignment element 2 in this case is fixed to the vehicle wing fastening structure TF.

The actuation of the tilting levers 23 takes place through the engagement thereof with the fixing receiver assembly 4. This is shown purely schematically in FIGS. 6a and 6b and is explained in connection with the further example of the tilting levers 23, number 3 and number 4, and also the fixing receiver assembly 4 according to FIG. 5. The two tilting levers 23 are configured and arranged perpendicularly to the y-direction y in mirror-symmetrical fashion with respect to a mirror symmetrical plane sp. The second lever arm 25 has a hook-like, rounded design at its free end 251 facing in the y-direction y in this case. Spaced apart from the free end 251 in the engagement direction e, the second lever arm 25 has a ramp 252 facing with a directional component against the engagement direction e. According to this design of the tilting lever or tilting levers 23, the fixing receiver assembly 4 has a catch opening 41 opened in conical fashion in the engagement direction e with an undercut 411 adapted to the hook-shaped rounded end 251 of the second lever arm 25, in order to form a catch connection with the associated tilting lever 23. A first ramp 412 is provided in the engagement direction e adjacent hereto and a second ramp 413 is provided on the exit side of the catch opening 41. Both ramps 412, 413 point with a directional component in the engagement direction e. In addition, a further cavity 414 is arranged roughly halfway up for the further catch mechanism of the second lever arm 25.

Since this cavity 414 runs radially outwards and is therefore accessible from outside, the catch mechanism can easily be released, for example by a pusher introduced radially from the outside into the cavity, in that said pusher engages radially inwards and in the engagement direction e with the assigned second lever arm and releases it from the catch mechanism. This may be used, for example, in case of a repair or replacement of the headlamp structure.

In reference to FIGS. 6a and 6b, FIG. 6a shows how the headlamp structure S with the fixing receiver assembly 4 in the engagement direction e is moved via the alignment structure 2 which is already displaceably connected to the vehicle wing fastening structure KF in the xy-plane in such a manner that one of the tilting levers 23 strikes with its free end 251 against the left second ramp 413 in this case. This means that the alignment element 2 is virtually trapped by the catch opening 41 and moved into the alignment position. In this example, as the fixing receiver assembly 4 is lowered further via the alignment element 2, the left tilting lever 23 slides with its hook-like rounded end 251 on the second left ramp 413. As a result of this, the alignment element 2 is moved in the alignment receiver assembly 3 drawn in the y-direction y, i.e. to the right, until both tilting levers 23, as shown in FIG. 6b, bear against the second ramp 413 assigned. In this position, the alignment element 2 is furthermore arranged displaceably in the alignment receiver assembly 3 in the xy-plane, so that this alignment of the alignment element 2 takes place without strain in respect of the xy-plane.

With a further lowering of the fixing receiver assembly of the headlamp structure S via the tilting levers 23, these are guided further to the catch opening 41 assigned in each case with their free end 251, wherein they are pivoted while sliding on the first ramp 412 in the system rotating direction a and engage with their hook-like end 251 with the catch opening 41. With this sliding on the first ramp 412, the tilting levers 23 are pivoted in the system rotating direction a in such a manner that they bear against the rear side face 311 frictionally with their first lever arm 24 with elastic pretensioning. Consequently, with the mounting of the fixing receiver assembly 4 via the second lever arm 25 following the alignment with respect to the xy plane, the fixing of the alignment element 2 on the connecting structures S, TF takes place simultaneously in respect of all directions x, y, z.

In the engagement direction e behind the ramp 252 of the second lever arm 25, a recess 253 is provided through which this region of the second ramp 252 is likewise used as a catch projection 254. In this case, this catch projection 254 formed by the recess 253, as can be seen in FIG. 7, engages in locking fashion with the cavity 414 of the fixing receiver assembly 4 and is supported in the engagement direction e on the cavity 414. In this way, a second catch mechanism is produced to stabilize the catch connection.

In the example of the headlamp fastening system 1 with the alignment element 2 according to FIGS. 3 and 4, the pivot axis s is designed as a stand-alone component, which, as indicated in FIG. 4, is rotatably mounted in a fastening receiver 211 provided on the front clamp part 21. As can be seen in FIG. 8, in particular, the pivot axis s in the example of the headlamp fastening system 1 according to FIG. 7 is formed by the front clamp part 21, in that said clamp part has axial cylindrical projections 212 facing one another as the pivot axis s in respect of the same, said projections being integrally connected to the front clamp part 21. In the installation position, these projections engage with cylindrical openings 213 provided on the tilting lever. Instead of this, the clamp part 21 and the tilting lever 23 can also each be integrally connected to one another via bolt portions which are twisted for turning.

The fixing receiver assembly 4 lies in the engagement direction e in this case directly on the front clamp part 21 on the end face, as a result of which the stability of the catch connection is increased. This is shown in FIG. 7 with the help of a further example of the alignment element 2 and, in addition, can easily be deduced from the proportions of the orientation element 2 in FIG. 6, namely those of the catch opening 41 in relation to those of the fixing receiver assembly 4.

In the example of the fastening system 1 in accordance with FIG. 9, there is a reversal of the structural configuration without, however, there being a different functional principle. In this case the two tilting levers 23 form a fastening receiver 255 for the fixing receiver assembly 4 which engages in a catching manner in this case in the form of two tilting levers 256 with the fastening receiver 255. This produces a reversal of the pivoting of the tilting levers 23, in that said tilting levers are pivoted radially outwards in the system rotating direction a in respect of the engagement direction e. In this case, the left tilting lever 23 engages here with its first lever arm 24 to the right of the right tilting lever 23 and, conversely, the right tilting lever 23 engages here with its first lever arm in number 24 to the left of the left tilting lever 23 in this case.

Unlike in the other examples of the fastening system 1 shown here, in the examples of the fastening system 1 according to FIGS. 7 and 8, a spacing element, number 5, is provided between the fixing receiver assembly 4 and the front clamp part 21, via which the fixing receiver assembly 4 is supported on the front clamp part 21.

A problem addressed by the present disclosure is that of providing a generic fastening system in which the 1-valued alignment element can be fixed to the structures to be connected at least substantially free from stress, with zero play and without the use of further tools.

The problem being addressed is solved according to the present disclosure by the features of claim 1. Advantageous developments are described in the dependent claims. The problem posed is solved in that the fastening system is designed in such a manner that the structures to be connected are held relatively displaceably to one another via the 1-valued alignment element in an alignment position in respect of the spatial directions, in particular the x-, y- and z-direction of the vehicle, and that the transfer of the alignment element from the alignment position into a fixing position for fixing the structures in the z-direction simultaneously brings about the fixing thereof in the x-direction and the y-direction.

The fixing of the alignment element to the structures in the z-direction thereby simultaneously triggers the fixing thereof in respect of the xy-plane. The fact that the structures to be connected are held relatively displaceably to one another via the 1-valued alignment element in an alignment position in respect of the spatial directions, in particular the x-, y- and z-direction of the vehicle, means that this alignment in the z-direction can take place with simultaneous displacement in respect of the xy-plane, so there can be no increase in stress in respect of this xy-plane and therefore no strain on the headlamp structure. In the fixing position, the alignment element is arranged with the structures to be connected fixedly connected to one another. The fact that the fixing of the alignment element and therefore the implementation of the third fastening takes place simultaneously with the transfer of the fastening element from its stress-free, or substantially stress-free, alignment position in respect of the xy-plane into the fixing position means that in the fixing position in the connection of the two structures to be connected there are no stresses in respect of the xy-plane. The fixing of the alignment element to the structures can take place by a locating catch connection, as described in greater detail below, the production whereof requires no tools.

Advantageously, the alignment element for alignment in the z-direction can align the structures to be connected in respect of the xy-plane and in respect of the z-direction in such a manner that they remain loose to one another in an alignment position. In particular, the alignment element for alignment in the z-direction in an alignment position in which it may be arranged held on the one support structure and on the headlamp structure in an alignment position in respect to the xy plane and in respect of the z-direction. This loose configuration of the alignment element means that the structures to be connected are loosely connected to one another. In particular, the structures to be connected are arranged in the alignment position aligned in an at least substantially stress-free manner relative to one another. In particular, the structures to be connected are arranged in the alignment position to form a given amount of play in respect of the spatial directions or the x-, y- and/or z-direction. In this case, this play in respect of the spatial directions may be differently configured. In particular, the structures to be connected may be arranged adjacent to one another in the z-direction via the alignment element in the alignment position.

With regard to the xy-plane, the structures to be connected via the alignment element may be displaceably arranged relative to one another with a very large tolerance of up to +/−3 mm or up to +/−4 mm or more. Prior to fixing, the structures can be aligned relative to one another in respect of the z-direction, while at the same time a movement to balance tolerances or assembly errors, for example, parallel to the xy-plane within the very large play of up to +/−3 mm or up to +/−5 mm or more, can take place. The structures to be connected can be arranged in a stress-free manner relative to one another in relation to all spatial directions in the alignment position. Moreover, the structures to be connected can move in the alignment position in the z-direction to balance tolerances or assembly errors. For example, the structures to be connected can move to the necessary degree in relation to the xy-plane relative to one another, so that they are arranged in an at least substantially stress-free manner with respect to one another relative to the xy-plane and the z-direction. The fixing of the alignment element in respect of the z-direction to the structures to be connected and, at the same time, the fixing of the alignment element to the structures to be connected in relation to the xy-plane takes place with this stress-free positioning of the structures to be connected to one another. "Substantially stress-free" in this case refers to the fact that it cannot be precluded that very small stress fractions resulting from static friction and/or dynamic friction will still remain due to the alignment processes described below between the alignment element and the structures. It is contemplated, however, that this friction, where appropriate, is minimized using customary methods.

In order to achieve freedom from stress, it may be provided that the alignment element is arranged such that it can be transferred from the alignment position into a fixing position, in which it is arranged fixed in relation to all three spatial directions (x,y,z) simultaneously on the headlamp structure and the one support structure. It may be arranged in a fixable or fixed manner simultaneously on the headlamp structure and the one support structure in the fixing position in relation to all three spatial directions (x,y,z). The fixing may take place simultaneously in relation to the three spatial directions.

The structures to be connected may be spaced apart from one another via the alignment element. It is favorable from a design point of view for the connection of the alignment element to the one support structure and the connection of the alignment element to the headlamp structure to be arranged at points of the alignment element spaced apart from one another, particularly in respect of the z-direction or engagement direction. This makes it easy for different types of connections to be formed at these points.

In an advantageous example of the headlamp fastening system, an alignment receiver assembly for engagement of the alignment element can be provided on the one support structure or on the headlamp structure. In this case, the alignment element may be displaceable in respect of the xy-plane and arranged with a preferably small amount of tolerance in the alignment receiver assembly in respect of the z-axis in the alignment position. This displaceability in respect of the xy-plane may amount to +/−3 mm to +/−4 mm or more. In this case, the alignment element may be arranged in a clamp-like manner preferably with tolerance in an encompassing manner in respect of the z-axis, in particular, a region of the of the alignment receiver assembly fixing a base. With the movement of the alignment element from the alignment position to the fixing position, a closure of the clamp-like encasing may take place in such a manner that the alignment element is fixed in the alignment receiver assembly. Since, prior to fixing, a stress-free alignment of the support structures relative to one another via the alignment element is provided, the fixing can take place harmlessly without any play.

In an advantageous example of the headlamp fastening system, the alignment element may have a front clamp part, and a rear clamp part parallel or roughly parallel to the z-direction in relation to the engagement direction of its clamp-like encasing. In particular, the front clamp part may be configured as a stop that is effective in the engagement direction.

In some examples, at least the part of the front clamp part acting as a stop in relation to the engagement direction can be arranged to extend radially outwardly from the alignment element. The stop may advantageously extend in relation to the engagement direction at least over one or a plurality of peripheral portions (preferably over the full periphery) radially outwards away from the alignment element. In a structurally uncomplicated fashion, the stop may be plate-shaped. This means that the stop may come into abutment with a stop surface facing in the engagement direction in a planar manner with a bearing surface provided in the alignment receiver assembly.

The alignment element may have a lever device with a lever for its alignment relative to the connecting structures. The lever device may, on the one hand, be arranged in an effectively force-transmitting manner in the alignment receiver assembly provided on the support structure or the headlamp structure and, in the installation position preferably spaced apart therefrom in the engagement direction. On the other hand, the lever device may be arranged in an engaging manner in a fixing receiver assembly provided on the headlamp structure or the support structure. In this way, forces can be transmitted from the one structure to the other. The transmission of force can take place in the fixing position and/or the alignment position. The force may be transmitted via the lever.

The lever may be configured as a tilting lever. The lever may engage with the fastening receiver at the end in each case. The rear clamp part of the alignment element may be formed by levers of the lever device at least preferably designed as tilting levers. In the fixing position, the tilting lever may be arranged connecting the structures to be connected in an effective force-transmitting manner. In particular, the tilting lever in conjunction with the stop may engage with the two structures to be connected in an effective force-transmitting manner, such that the alignment element is fixed to these two structures in the fixing position. When the two structures are arranged in the alignment position via the alignment element they may be connected but displaceable in the x-, y-, and z-directions relative to one another until the fixing position is reached. When the fixing position is reached, the two structures simultaneously become fixed via the fastening element fixed to one another.

The tilting lever may have a pivot axis perpendicular to the z-direction that allows the tilting lever to be pivotably movable in relation to the alignment element, in particular to the front clamp part. The pivot axis may, for example, be arranged mounted as a stand-alone component on the front clamp part. In particular, the alignment element may be formed substantially from the at least one tilting lever, the front clamp part, and the pivot axis. By reducing the number of components to two—the tilting lever and the front clamp part—the pivot axis can be formed by pins flush with one another provided on the components, said pins engaging with bearing openings provided on the other component.

The alignment element may be integrally formed. For this purpose, the pivot axis may be configured as a torsional axis which is arranged integrally with the front clamp part and connected to the rear clamp part. In this case, the pivoting movement of the rear clamp part can take place at least predominantly through torsion of the pivoting axis.

The tilting lever may have two lever arms emerging at angles from the pivot axis, in particular, lever arms disposed perpendicularly to one another, i.e. a first lever arm and a second lever arm. The first lever arm may be arranged in the fixing position engaging in an effective force-transmitting manner with the alignment receiver assembly of the one support structure or the headlamp structure. The second lever arm may also be arranged in the fixing position engaging in an effective force-transmitting manner with a fixing receiver assembly provided on the headlamp structure or else the support structure.

The tilting lever can, therefore, engage with both fastening receiver in an effective force-transmitting manner in the alignment position and in the fixing position. In this case, the tilting lever can be engaged in the alignment position creating the play referred to above. The first lever arm is preferably used in the alignment position as a stop to limit the play on the alignment element against the engagement direction. This means that the play with which the alignment element engages in the alignment position with the alignment receiver assembly is set by means of the axial spacing to the z-direction of the stop described above to that of the first lever arm.

The alignment receiver assembly may exhibit a cavity. In this case, the first lever arm of the tilting lever may protrude beyond the cavity in the engagement direction. Against the engagement direction in the alignment position, the first lever arm can be spaced apart at least with play relative to a rear side surface of the cavity in the engagement direction. In this way, displaceability of the alignment element relative to the one support structure or the headlamp structure can be achieved. In addition, the first lever arm in the fixing position thereof may bear against the one support structure or the headlamp structure in a positive-locking, frictional and/or substance bonded manner.

The first lever arm may exhibit an elongate cross section in respect of the z-direction, to which the opening cross section of the cavity is adapted, preferably with an oversize. This easily enables the first lever arm to be inserted easily in the insertion direction through the cavity into the alignment receiver assembly. For this purpose, the first lever arm can be brought in with its cross section flush with the opening cross section of the cavity through said cavity into an insertion position, wherein the alignment element in the insertion position strikes with its front clamping part in the engagement direction against the front of the side face in which the cavity is introduced. The plate-shaped front clamp part described above can be adjusted to the opening cross section of the cavity in terms of its extent in the xy-plane in such a manner that it cannot be conducted in any rotational position of the alignment element relative to the cavity through the same. This means that it always remains in the insertion direction in a stop-effective manner.

In a further step, the alignment element can be moved with a rotational movement peripheral to the z-direction about an angle of rotation of preferably 90° from the insertion position into the alignment position. In the alignment position, the first lever arm engages under the rear opening edge of the cavity in the insertion direction, in such a manner that the first lever arm is held with tolerance against the insertion direction in the alignment receiver assembly. In addition, the opening cross section of the cavity may exhibit an oversize in respect of the first lever arm, through which the first lever arm and therefore the alignment element is displaceably mounted in respect of the xy-plane relative to the cavity in the same. This relative movement in the xy-plane can be limited by the radial boundary of the cavity.

In a third step, the first lever arm can be pressed as a rear clamp part by actuating the tilting lever on the second lever arm in a fixing rotational direction towards the front clamp part and therefore against the rear side face in the engagement direction, in which the cavity opens out. In this way, the alignment element is fixed to the one support structure. The tilting lever may be actuated by the introduction of force to the second lever arm, in that said lever arm engages against the engagement direction with a fixing receiver assembly provided in or on the headlamp structure or on one of the support structures. The fixing receiver assembly may be configured as a catch fastening receiver, wherein it has an open conical design for engagement of the second lever arm against the engagement direction in the engagement direction, preferably forming a ramp.

In order to center the alignment element in respect of the xy-plane and/or to actuate the tilting lever, a guide region with the ramp can be provided on the second lever arm and/or on the catch fastening receiver in each case. The ramp, arranged on the second lever arm, may be arranged with a direction component against a pivoting direction provided by the first lever arm of the tilting lever for pressing abutment against the cavity and, arranged in the guide portion of the catch fastening receiver, with a direction component face in this pivoting direction provided. With the sliding away on these ramps, the centering in respect of the xy-plane and, therefore, the fine adjustment of the relative position of the alignment element to the structures to be connected can take place. In addition, at the end of the alignment of the alignment element in the xy-plane, the third step described above is initiated, during which the clamping parts are moved towards one another and therefore clamp to the one fastening structure. As a result of this, the alignment element is fixed to the one support structure in a positive-locking, frictional and/or substance-bonded manner, preferably with elastic prestressing.

Consequently, with the fitting of the catch fastening receiver, the fixing of the structures to be connected in relation to the spatial directions can take place simultaneously, preferably via the free end of the second lever arm. In order to stabilize the connection of the two structures via the alignment element, it may be provided that in the fixing position in the insertion direction the catch fastening receiver bears against the plate-shaped stop in a blunt manner and/or engaging with recesses provided on the plate-shaped stop either indirectly, for example via a preferably hollow-cylindrical spacing element, or directly, for example via one or a plurality of projections extending away from the catch fastening receiver in the insertion direction. In both cases, it is advantageous for the alignment element to be arranged inside coaxially to the spacing element or to the projections.

In a manner that is favorable in terms of force mechanics and in relation to stability, it may be provided that the alignment element has two tilting levers which preferably act in a similar manner. These may be arranged radially opposite one another in respect to the engagement direction and also, in particular, spaced apart radially from one another. In particular, the two tilting levers may be arranged parallel to one another in respect of the second lever arms in the fixing position. In the fixing position, the first lever arms of the two tilting levers may, in addition, face away from one another radially in respect of the engagement direction or be arranged in a radially intersecting manner. They may strike against one another to limit the rotational movement against the fixing rotational direction.

In an alternative solution of the problem, a method for fastening and aligning a headlamp structure on two support structures of the motor vehicle, in particular on the vehicle wing fastening structure and the radiator mounting structure, in respect of the three spatial directions, in particular the x-, y,- and z-direction of the vehicle, by means of a headlamp fastening system according to one of claims 1-12, is provided. Following provision of the headlamp fastening system, this method may comprise the following steps:

arrangement of the alignment element on the structures to be connected in an alignment position in which it aligns the structures to be connected in respect of the xy-plane and in respect of the z-direction in an at least substantially stress-free manner relative to one another; and transfer of the alignment element from the alignment position into a fixing position in which it is fixed in respect of all three spatial directions (x,y,z) to both structures to be connected simultaneously.

It will be understood by one having ordinary skill in the art that construction of the described invention and other components are not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A headlamp fastening system for a vehicle comprising:
 a vehicle wing fastening structure;

a radiator mounting structure;

a headlamp structure; and a 1-valued alignment element configured to align and fix the headlamp structure with at least one of the vehicle wing fastening structure and the radiator mounting structure with respect to a z-direction relative to an x-, y-, and z-direction of the vehicle, wherein the 1-valued alignment element holds the vehicle wing fastening structure, the radiator mounting structure and the headlamp structure in an alignment position, wherein the vehicle wing fastening structure, the radiator mounting structure and the headlamp structure are relatively displaceable in the x-, y-, and z-direction relative to one another and wherein the vehicle wing fastening structure, the radiator mounting structure and the headlamp structure with respect to the xy-plane such that the vehicle wing fastening structure, the radiator mounting structure and the headlamp structure remain loose relative to one another; and a fixing position, wherein, upon the 1-valued alignment element fixing the vehicle wing fastening structure, the radiator mounting structure, and the headlamp structure relative to one another with respect to the z-direction, the vehicle wing fastening structure, the radiator mounting structure and the headlamp structure simultaneously become fixed relative to one another in the x- and y-direction.

2. The headlamp fastening system of claim 1, further comprising:

an alignment receiver assembly coupled to at least one of the vehicle wing fastening structure, the radiator mounting structure and the headlamp structure, wherein the 1-value alignment element engages with the alignment receiver assembly in the alignment position displaceably with respect to the xy-plane and in a clamp-like manner with respect to the z-direction.

3. The headlamp fastening system of claim 2, wherein the 1-value alignment element further comprises:

a front clamp part; and a rear clamp part, wherein the front clamp part and the rear clamp part form a clamp-like encasing having an engagement direction about parallel to the z-direction with respect to an engagement direction of the clamp-like encasing, wherein the front clamp part is configured as a stop that is effective in the engagement direction.

4. The headlamp fastening system of claim 3, wherein the front clamp part is arranged extending radially outwardly from the 1-value alignment element in the engagement direction.

5. The headlamp fastening system of claim 3, wherein the 1-value alignment element further comprises:

a lever device having at least one lever, wherein the rear clamp part is formed via the at least one lever.

6. The headlamp fastening system of claim 5, wherein the at least one lever is engaged in an effectively force-transmitting manner with at least one of the alignment receiver assembly and the fixing receiver assembly provided on at least one of the vehicle wing fastening structure, the radiator mounting structure, and the headlamp structure.

7. The headlamp fastening system of claim 5, wherein the lever is pivotally mounted to the front clamp part on a pivot axis perpendicular to the z-direction and is configured as a tilting lever that holds the vehicle wing fastening structure, the radiator mounting structure, and the headlamp structure in an effective force-transmitting manner in the fixing position.

8. The headlamp fastening system of claim 7, wherein the tilting lever further comprises:

a first lever arm; and a second lever arm, wherein the first lever arm is arranged in the fixing position and engages at least one of the alignment receiver assembly and the headlamp structure in an effective force-transmitting manner, and wherein the second lever arm is arranged in the fixing position and engages a fixing receiver assembly on at least one of the headlamp structure, the vehicle wing fastening structure, and the radiator mounting structure in an effective force-transmitting manner.

9. The headlamp fastening system of claim 8, wherein the alignment receiver assembly further comprises:

a cavity that extends beyond the first lever arm of the tilting lever, wherein the first lever arm, while in the alignment position, is spaced apart at least in relation to a rear side surface delimiting the cavity in the engagement direction.

10. The headlamp fastening system of claim 9, wherein the profile of the cavity and the longitudinal profile of the first lever arm are elongate and adapted to one another and the first lever arm delimits the underside of the profile of the cavity.

11. The headlamp fastening system of claim 8, wherein the fixing receiver assembly is configured as a catch with a conical catch opening that faces the engagement direction and engages with the second lever arm of the tilting lever when the first lever arm of the tilting lever is pivoted into the fixing position.

12. The headlamp fastening system of claim 7, wherein the rear clamp part is formed by two tilting levers arranged radially opposite one another with respect to the engagement direction.

13. A headlamp fastening system for a vehicle comprising:

a 1-valued alignment element positionable in an alignment position and a fixing position, wherein the 1-valued alignment element allows for a vehicle wing fastening structure, a radiator mounting structure, and a headlamp structure relative to remain loose relative one another in the alignment position and simultaneously fixes each relative to one another in a z-direction, an x-direction and a y-direction in the fixing position.

14. A headlamp fastening system for a vehicle comprising:

a vehicle wing fastening structure;

a radiator mounting structure;

a headlamp structure;

a 1-valued alignment element configured to align and fix the headlamp structure with at least one of the vehicle wing fastening structure and the radiator mounting structure with respect to a z-direction relative to an x-, y-, and z-direction of the vehicle, wherein the 1-valued alignment element holds the vehicle wing fastening structure, the radiator mounting structure and the headlamp structure in an alignment position, wherein the vehicle wing fastening structure, the radiator mounting structure and the headlamp structure are relatively displaceable in the x-, y-, and z-direction relative to one another; and a fixing position, wherein, upon the 1-valued alignment element fixing the vehicle wing fastening structure, the radiator mounting structure, and the headlamp structure relative to one another with respect to the z-direction, the vehicle wing fastening structure, the radiator mounting structure and the headlamp structure simultaneously become fixed relative to one another in the x- and y-direction; and an alignment receiver assembly coupled to at least one of the vehicle wing fastening structure, the radiator mounting structure and the headlamp structure, wherein the 1-value alignment element engages with the alignment receiver assembly in the alignment position displaceably with respect to the xy-plane and in a clamp-like manner with respect to the z-direction.

* * * * *